United States Patent
Pomerantsev

(10) Patent No.: US 11,847,223 B2
(45) Date of Patent: Dec. 19, 2023

(54) METHOD AND SYSTEM FOR GENERATING A LIST OF INDICATORS OF COMPROMISE

(71) Applicant: Group IB TDS, Ltd, Moscow (RU)

(72) Inventor: Ilia Sergeevich Pomerantsev, Mendeleevo (RU)

(73) Assignee: GROUP IB TDS, LTD, Moscow (RU)

( * ) Notice: Subject to any disclaimer, the term of this patent is extended or adjusted under 35 U.S.C. 154(b) by 350 days.

(21) Appl. No.: 17/178,320

(22) Filed: Feb. 18, 2021

(65) Prior Publication Data
US 2022/0043911 A1  Feb. 10, 2022

(30) Foreign Application Priority Data

Aug. 6, 2020 (RU) ................... 2020126232

(51) Int. Cl.
*G06F 21/56* (2013.01)
*G06F 16/2458* (2019.01)
(Continued)

(52) U.S. Cl.
CPC ........ *G06F 21/566* (2013.01); *G06F 16/2468* (2019.01); *G06F 21/53* (2013.01); *G06N 20/00* (2019.01); *G06F 2221/033* (2013.01)

(58) Field of Classification Search
CPC ......... G06F 21/50–568; G06F 16/2468; G06F 2221/033; G06N 20/00
See application file for complete search history.

(56) References Cited

U.S. PATENT DOCUMENTS

| | | | |
|---|---|---|---|
| 6,928,434 B1 | 8/2005 | Choi et al. | |
| 7,225,343 B1 | 5/2007 | Honig et al. | |

(Continued)

FOREIGN PATENT DOCUMENTS

| | | | |
|---|---|---|---|
| AU | 2017203008 B2 | 3/2019 | |
| CN | 103491205 A | 1/2014 | |
| 7,383,581 | B1 | 6/2008 | Moore et al. |
| 7,496,628 | B2 | 2/2009 | Arnold et al. |
| 7,712,136 | B2 | 5/2010 | Sprosts et al. |
| 7,730,040 | B2 | 6/2010 | Reasor et al. |
| 7,865,953 | B1 | 1/2011 | Hsieh et al. |

(Continued)

OTHER PUBLICATIONS

Lajevardi, Amir Mohammadzade, and Morteza Amini. "A semantic-based correlation approach for detecting hybrid and low-level APTs." Future Generation Computer Systems 96 (2019): 64-88. (Year: 2019).*

(Continued)

*Primary Examiner* — Madhuri R Herzog
(74) *Attorney, Agent, or Firm* — BCF LLP

(57) ABSTRACT

A method and a system for identifying indicators of compromise are provided. The method comprises: obtaining a given malware carrier configured for execution a main malware module; generating, based on the given malware carrier, an attack roadmap, the attack roadmap including a plurality of malware carriers; determining a malware class of each one of the plurality of malware carriers; generating a current list of indicators of compromise of each of the plurality of malware carriers; searching a database to locate at least one stored attack roadmap including a plurality of stored malware carriers; retrieving from the database a stored list of indicators of compromise for each of the plurality of stored malware carriers; generating an amalgamated list of indicators of compromise based on the current list of indicators and the stored digital list of indicators of compromise; storing, in the database, the amalgamated list of indicators of compromise.

20 Claims, 6 Drawing Sheets

(51) Int. Cl.
   *G06N 20/00* (2019.01)
   *G06F 21/53* (2013.01)

(56) References Cited

U.S. PATENT DOCUMENTS

| | | |
|---|---|---|
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,683,595 B1 | 3/2014 | Barker |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,165,142 B1 | 10/2015 | Sanders et al. |
| 9,210,111 B2 | 12/2015 | Chasin et al. |
| 9,215,239 B1 | 12/2015 | Wang et al. |
| 9,223,972 B1 | 12/2015 | Vincent et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,747,446 B1* | 8/2017 | Pidathala ............... G06F 21/56 |
| 9,917,852 B1 | 3/2018 | Xu et al. |
| 9,934,376 B1 | 4/2018 | Ismael |
| 10,148,685 B2 | 12/2018 | Hassanzadeh et al. |
| 10,284,574 B1 | 5/2019 | Aziz et al. |
| 10,467,411 B1 | 11/2019 | Pidathala et al. |
| 10,546,143 B1 | 1/2020 | Wesson |
| 10,783,247 B1 | 9/2020 | Steinfadt et al. |
| 10,990,674 B2* | 4/2021 | Srinivasagopalan ........................ G06F 21/563 |
| 2002/0161862 A1 | 10/2002 | Horvitz |
| 2003/0009696 A1 | 1/2003 | Bunker et al. |
| 2006/0021029 A1 | 1/2006 | Brickell et al. |
| 2006/0037080 A1 | 2/2006 | Maloof |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0172651 A1 | 7/2008 | Davia |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0227691 A1 | 8/2013 | Aziz et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0178306 A1 | 6/2015 | Yang et al. |
| 2015/0200963 A1 | 7/2015 | Geng et al. |
| 2015/0220735 A1 | 8/2015 | Paithane et al. |
| 2015/0227364 A1 | 8/2015 | Asadullah et al. |
| 2015/0295945 A1 | 10/2015 | Canzanese et al. |
| 2015/0356291 A1 | 12/2015 | Zakorzhevsky et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0057159 A1* | 2/2016 | Yin ....................... H04L 63/145 726/23 |
| 2016/0065595 A1 | 3/2016 | Kim et al. |
| 2016/0112445 A1 | 4/2016 | Abramowitz |
| 2016/0127388 A1 | 5/2016 | Cabot et al. |
| 2016/0127907 A1 | 5/2016 | Baxley et al. |
| 2016/0132521 A1 | 5/2016 | Reininger et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0006045 A1 | 1/2017 | Kivva et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0171230 A1* | 6/2017 | Leiderfarb ............ H04L 63/145 |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0251003 A1 | 8/2017 | Rostami-Hesarsorkh et al. |
| 2017/0262633 A1 | 9/2017 | Miserendino et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |

(56) References Cited

U.S. PATENT DOCUMENTS

| | | |
|---|---|---|
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0165452 A1 | 6/2018 | Sun et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2018/0365420 A1 | 12/2018 | Krylov et al. |
| 2019/0005239 A1 | 1/2019 | Park et al. |
| 2019/0089737 A1 | 3/2019 | Shayevitz et al. |
| 2019/0114423 A1 | 4/2019 | Chistyakov et al. |
| 2019/0158525 A1 | 5/2019 | Rostami-Hesarsorkh et al. |
| 2019/0207973 A1 | 7/2019 | Peng |
| 2019/0230098 A1 | 7/2019 | Navarro |
| 2019/0373005 A1 | 12/2019 | Bassett |
| 2020/0092306 A1 | 3/2020 | Jusko et al. |
| 2020/0134702 A1 | 4/2020 | Li |
| 2020/0302058 A1 | 9/2020 | Kenyon et al. |

FOREIGN PATENT DOCUMENTS

| | | | |
|---|---|---|---|
| CN | 104504307 A | 4/2015 | |
| CN | 103020494 B | 6/2015 | |
| CN | 105429956 A | 3/2016 | |
| CN | 105897714 A | 8/2016 | |
| CN | 106131016 A | 11/2016 | |
| CN | 106506435 A | 3/2017 | |
| CN | 106713312 A | 5/2017 | |
| CN | 107392019 A | 11/2017 | |
| CN | 107392456 A | 11/2017 | |
| EP | 1160646 A2 | 12/2001 | |
| EP | 2916256 A1 | 9/2015 | |
| EP | 2410452 B1 | 1/2016 | |
| EP | 2743854 B1 | 12/2018 | |
| EP | 2946331 B1 | 8/2019 | |
| GB | 2425622 A | 11/2006 | |
| GB | 2493514 A | 2/2013 | |
| KR | 10-2007-0049514 A | 5/2007 | |
| KR | 20120090131 A | * 8/2012 | ............ G06F 17/30 |
| KR | 10-1514984 B1 | 4/2015 | |
| RU | 91213 U1 | 1/2010 | |
| RU | 2382400 C2 | 2/2010 | |
| RU | 107616 U1 | 8/2011 | |
| RU | 2446459 C1 | 3/2012 | |
| RU | 129279 U1 | 6/2013 | |
| RU | 2487406 C1 | 7/2013 | |
| RU | 2488880 C1 | 7/2013 | |
| RU | 2495486 C1 | 10/2013 | |
| RU | 2522019 C1 | 7/2014 | |
| RU | 2523114 C2 | 7/2014 | |
| RU | 2530210 C2 | 10/2014 | |
| RU | 2536664 C2 | 12/2014 | |
| RU | 2538292 C1 | 1/2015 | |
| RU | 2543564 C1 | 3/2015 | |
| RU | 2566329 C2 | 10/2015 | |
| RU | 2571594 C2 | 12/2015 | |
| RU | 2580036 C2 | 4/2016 | |
| RU | 2589310 C2 | 7/2016 | |
| RU | 164629 U1 | 9/2016 | |
| RU | 2607231 C2 | 1/2017 | |
| RU | 2610586 C2 | 2/2017 | |
| RU | 2613535 C1 | 3/2017 | |
| RU | 2622870 C2 | 6/2017 | |
| RU | 2625050 C1 | 7/2017 | |
| RU | 2628192 C2 | 8/2017 | |
| RU | 2636702 C1 | 11/2017 | |
| RU | 2654146 C1 | 5/2018 | |
| RU | 2670906 C9 | 12/2018 | |
| RU | 2681699 C1 | 3/2019 | |
| RU | 2702269 C1 | 10/2019 | |
| RU | 2706883 C1 | 11/2019 | |
| RU | 2706896 C1 | 11/2019 | |
| RU | 2708356 C1 | 12/2019 | |
| RU | 2728497 C1 | 7/2020 | |
| RU | 2728498 C1 | 7/2020 | |
| RU | 2738344 C1 | 12/2020 | |
| WO | 0245380 A2 | 6/2002 | |
| WO | 2009/026564 A1 | 2/2009 | |
| WO | 2011/045424 A1 | 4/2011 | |
| WO | 2012/015171 A2 | 2/2012 | |
| WO | 2017/111835 A1 | 6/2017 | |
| WO | 2019/010182 A1 | 1/2019 | |

OTHER PUBLICATIONS

Search Report with regard to the RU Patent Application No. 2020126232 completed Jan. 28, 2021.

Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.

Notice of Allowance with regard to the U.S. Appl. No. 17/077,132 dated Oct. 11, 2022.

Search Report with regard to the NL Patent Application No. 2027556 completed Sep. 29, 2021.

Phuong, "On Preempting Advanced Persistent Threats Using Probabilistic Graphical Models", arxiv.org, Cornell University Library, 201 Olin Library Cornell University Ithaca, NY 14853, Mar. 2019, pp. 1-14.

Manuel et al., "A survey on automated dynamic malware-analysis techniques and tools", ACM Computing Surveys, vol. 44, No. 2, Feb. 2012, pp. 1-49.

Tokhtabayev et al., "Malware Analysis and Detection via Activity Trees in User-Dependent Environment", Aug. 2017, ICIAP: International Conference on Image Analysis and Processing, 17th International Conference, Naples, Italy, Sep. 9-13, 2013. Proceedings NGS; [Lecture Notes in Computer Science; Lect.Notes Computer], Springer, Berlin, Heidelberg, pp. 211-222.

Grant Decision and Search Report with regard to the RU Patent Application No. 2019139630 completed Jun. 26, 2020.

Dauber et al., "Stylometric Authorship Attribution in Collaborative Documents", Materials of International Conference on Cyber Security Cryptography and Machine Learning (CSCML) 2017, pp. 115-135.

Afroz, Deception in Authorship Attribution, Drexel University, 2013, http://hdl.handle.net/1860/4431, pp. 1-91.

Granin, "Text Analyzer", https://habr.com/ru/post/114186/ and Machine Translation into English by Yandex Translate on Oct. 21, 2020, pdf 32 pages.

"Authorship Attribution Program by NeoNeuro", https://neoneuro.com accessed Jul. 31, 2020, pdf 5 pages.

"Tools for Software Analysis and Forensic Engineering, S.A.F.E.", https://www.safe-corp.com/index.htm accessed Jul. 31, 2020, pdf 2 pages.

English Abstract for CN 103020494 retrieved on Espacenet on Oct. 21, 2020.

Grant Decision and Search Report with regard to the RU Patent Application No. 2019139628 completed Jun. 26, 2020.

Search Report with regard to the counterpart Patent Application No. NL 2029433 completed Oct. 18, 2022.

Singh Jagsir et al., "A survey on machine learning-based malware detection in executable files", Journal of Systems Architecture, Elsevier BV, NL, Aug. 2020, pp. 1-24.

Notice of Allowance with regard to the U.S. Appl. No. 17/087,775 dated Nov. 15, 2021.

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals

(56) References Cited

OTHER PUBLICATIONS of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", Infocom, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Search Report with regard to RU Patent Application No. 2021108261 completed Feb. 28, 2022.
English Abstract for RU91213 retrieved on Espacenet on Mar. 25, 2022.
Office Action with regard to the counterpart U.S. Appl. No. 15/707,641 dated Apr. 25, 2019.
English Translation of CN106713312, ©Questel—FAMPAT, Jul. 17, 2019.
English Translation of CN105897714, ©Questel—FAMPAT, Jul. 17, 2019.
English Translation of CN106506435, ©Questel—FAMPAT, Jul. 26, 2019.
English Translation of CN107392456, ©Questel—FAMPAT, Jul. 29, 2019.
English Translation of CN103491205, ©Questel—FAMPAT, Jul. 29, 2019.
English Translation of CN106131016, ©Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No. 10201901079U.
Invitation to Respond to Written Opinion dated Jul. 31, 2019 with regard to the counterpart SG Patent Application No. 10201900335P.
Search Report with regard to the counterpart RU Patent Application No. 2018144708 completed Aug. 16, 2019.
English Translation of KR10-2007-0049514 (Description, Claims) retrieved on Espacenet on Oct. 16, 2019.
Search Report with regard to the counterpart RU Patent Application No. 2018147431 completed Aug. 15, 2019.
English Abstract of KR10-1514984 retrieved on Espacenet on Oct. 15, 2019.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 {Year: 2005)—Notice of Allowance with regard to the counterpart U.S. Appl. No. 15/707,641.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to the counterpart U.S. Appl. No. 16/270,341 dated May 27, 2020.
Notice of Allowance with regard to the counterpart U.S. Appl. No. 15/858,013 dated Jun. 10, 2020.
Office Action with regard to the counterpart U.S. Appl. No. 16/249,004 dated Apr. 23, 2021.
Search Report with regard to EP Patent Application No. EP20924272 completed Nov. 30, 2022.
Chandramohan et al., "A scalable approach for malware detection through bounded feature space behavior modeling", 28th IEEE/ACM International Conference on Automated Software Engineering (ASE), IEEE, 2013, pp. 312-322.
Alahmadi et al., "MalClassifier: Malware family classification using network flow sequence behaviour", APWG Symposium on Electronic Crime Research (ECRIME), IEEE, 2018, pp. 1-13.
Galal et al., "Behavior-based features model for malware detection", Journal of Computer Virology and Hacking Techniques, Springer Paris, vol. 12, No. 2, 2015, pp. 59-67.
Pirscoveanu et al., "Analysis of malware behavior: Type classification using machine learning", International Conference on Cyber Situational Awareness, Data Analytics and Assessment (CYBERSA), Centre for Multidisciplinary Research, Innovation and Collaboration, 2015, pp. 1-7.
Search Report with regard to RU Patent Application No. 2020110068 completed Sep. 8, 2020.
International Search Report with regard to PCT/RU2020/000140 dated Nov. 19, 2020.
Search Report with regard to RU Patent Application No. 2020107922 completed Mar. 24, 2020.
International Search Report with regard to PCT/RU2020/000089 dated Oct. 29, 2020.
English Abstract for CN107392019 retrieved on Espacenet on Dec. 2, 2021.
Github / Linguist, https://github.com/github/linguist accessed on Sep. 24, 2021, pdf 6 pages.
Blackducksoftware / Ohcount, https://github.com/blackducksoftware/ohcount accessed on Sep. 24, 2021, pdf 4 pages.

* cited by examiner

METHOD AND SYSTEM FOR GENERATING A LIST OF INDICATORS OF COMPROMISE

CROSS-REFERENCE

The present application claims priority to a Russian Application No. 2020126232, entitled "METHOD AND SYSTEM FOR GENERATING A LIST OF INDICATORS OF COMPROMISE," filed on Aug. 6, 2020, the entirety of which is incorporated herein by reference.

FIELD

The present technology broadly relates to the field of information security; and, in particular, to a method and system for identifying indicators of compromise in a digital system.

BACKGROUND

Malicious software (malware) is a collective term referring to a malicious software application or code that can affect operation of a computer system or cause damage thereto. Generally, the malware is developed such that it may penetrate into the computer system, cause damage, partially intercept control over some processes, or disable computing devices, for example, computers, servers, network equipment, tablet devices, and mobile devices, as well as various devices connected to "Internet of Things" (IOT). As used herein, the penetration of malware into any computer system is referred to as an attack.

More specifically, an attack may include a set of actions executed by a malware application developed by an attacker and aimed at compromising one or more end devices of a network infrastructure (computers, servers, routers, etc.). Some of the attacks may be complex.

As used herein, a complex attack is referred to as a type of attack in which the malware application that reaches a final goal thereof (the main malware module) is disguised and/or encrypted, and the execution thereof is the result of executing a complex algorithm implemented by auxiliary applications, malware carriers—that is, specific software applications used by the attacker in the complex attack on the network infrastructure so as to compromise one or more end devices connected by said network infrastructure. The malware carrier typically has a multi-layered structure and may contain or launch, after downloading from a specified web server, other malware carriers. Thus, the complex attack may include sequential execution of several different malware carrier applications resulting in execution the main malware module.

Further, the main malware module, as used herein, refers to a final effector of compromise, i.e., the very malicious application whose execution is the ultimate goal of the complex attack. This may be, for example, the above-referenced data stealer that steals user data, a crypter that denies a user access to their documents, or another malicious software application. The main malware module is primarily characterized by the fact that the functionality thereof does not allow it to be used as a malware carrier; on the contrary, one or more malware carriers are required so as to launch the main malware module.

For example, to execute a given complex attack, an exploit is executed first, then a crypter, then a downloader, then another crypter, and finally, a data stealer, which, in this example, is the main malware module.

One of approaches to preventing complex attacks is identifying so called indicators of compromise. In the context of the present specification, "Indicators of compromise" (IOC) denote objects or data that allow a user or a specialized software application to detect the execution or simply the presence of malware in the computer system in question. Detection of any of the indicators may be indicative that the computer system has been compromised. The indicators of compromise may, for example, be folders in the file system or branches in the system registry disposed at specific addresses, files or processes with specific names present in memory, such as, for example, EQNEDT32.exe, non-typical network services launched on certain ports, some domain names found in traffic, and other similar artifacts of computing environment. It is obvious that information about how a particular indicator of compromise manifests itself, as well as IOC lists, can be stored in the form of plain text for ease of search.

Certain prior art approaches have been proposed to identify and interpret the indicators of compromise to protect computer systems from malware attacks.

Russian Patent No.: 2,702,269-C1 issued on Oct. 7, 2019, assigned to PAO Sberbank, and entitled "System for Intelligent Management of Cyber Threats" discloses a system for intelligent management of cyber threats involves searching for and collecting information regarding malicious code associated with known cyber threats; updating information regarding cybersecurity, said information comprising at least information: regarding a vulnerability of software that is being used and regarding the existence of malicious code associated with the at least one vulnerability, and information regarding an update to at least one piece of software, which provides protection against at least one type of vulnerability; and identifying user accounts that have been used in conjunction with resources associated with indicators of compromise, information about which is stored in a database.

Australian Patent Application Publication No.: 2017/203, 008-B2 published on May 25, 2017, assigned to Accenture Global Services Ltd, and entitled "Unstructured Security Threat Information Analysis" discloses a computer-implemented method including receiving, by an analysis system that includes one or more computers, a plurality of unstructured textual datasets that each include information about a respective potential security threat, determining that a first subset of the plurality of unstructured textual datasets and a second, different subset of the plurality of unstructured textual datasets both include information about a particular threat, the second subset being a different subset than the first subset, discarding the first subset in response to determining that the first subset of the plurality of unstructured textual datasets and the second, different subset of the plurality of unstructured textual datasets both include information about the particular threat, for each respective subset in the plurality of unstructured textual datasets that has not been discarded identifying, by the analysis system, one or more keywords in the respective subset, determining, by the analysis system, one or more text patterns of patterns that correspond with the respective subset using the identified one or more keywords by comparing strings from unstructured data in the respective subset with the patterns to determine whether each string matches, or is similar to, one or more of the patterns, identifying, by the analysis system, one or more intelligence types that correspond with the respective subset using the one or more text patterns, and associating, by the analysis system, for each respective intelligence type of the identified one or more intelligence types, the respective subset from the plurality of unstructured textual datasets with the respective intelligence type, determining a rule for a third party that indicates that the third party should receive data associated with a particular intelligence type of the one or more intelligence types, determining that the second subset of the plurality of unstructured textual datasets is associated with the particular intelligence type, and providing the second subset of the plurality of unstructured textual datasets that is associated with the particular intelligence type to the third party.

U.S. Pat. No. 10,148,685-B2 issued on Dec. 4, 2018, assigned to Accenture Global Services Ltd, and entitled "Event Correlation across Heterogeneous Operations" discloses methods, systems, and apparatus, including computer programs encoded on computer storage media, for determining a network security threat response. A data structure that represents communication events between computing devices of two or more network domains is received. The data structure is analyzed and a threat scenario that is based on a chain of communication events that indicates a potential attack path is determined. The chain of communication events include a sequence of communication events between computing devices proceeding from an originating computing device to a destination computing device, wherein the originating computing device and the destination computing device exist on different network domains. Attack pattern data, for the threat scenario and from a threat intelligence data source, that is associated with communications between computing devices that occurred during one or more prior attacks is received. Based on the threat scenario and the attack pattern data, one or more courses of action for responding to the threat scenario is determined, and information associated with the one or more courses of action is provided.

U.S. Pat. No. 10,467,411-B1 issued on Nov. 5, 2019, assigned to FireEye Inc, and entitled "System and Method for Generating a Malware Identifier" discloses a method for generating an identifier for use in malware detection. Herein, a first plurality of indicators of compromise are obtained. These indicators of compromise correspond to a plurality of anomalous behaviors. Thereafter, a filtering operation is performed on the first plurality of indicators of compromise by removing one or more indicators of compromise from the first plurality of indicators of compromise to create a second plurality of indicators of compromise. The identifier represented by the second plurality of indicators of compromise is created.

SUMMARY

It is an object of the present technology to ameliorate at least some inconveniences noted in the prior art.

Developers of the present technology have appreciated that complex attacks may be more effectively prevented by generating attack roadmaps thereof comprising data of identified malware carriers thereof. To that end, the methods and systems described herein are directed to generating a list of indicators of compromise associated with identified malware carriers of a given complex attack, by means of execution thereof in associated isolated program environments. Further, the list of indicators of compromise may be appended by indicators of compromise derived from data of malware carriers of previously identified complex attacks, different from the given one.

Thus, the comprehensive list of indicators of compromise may be used to generate the attack road map allowing for preventing the complex attack in the computer system.

More specifically, in accordance with a first broad aspect of the present technology, there is provided a computer-implemented method for identifying indicators of compromise in a digital system. The method is executable by a processor associated with the digital system. The method comprises: obtaining a given malware carrier configured for execution at least one main malware module; generating an attack roadmap by: detecting, based on the given malware carrier, at least one additional malware carrier, thereby forming a plurality of malware carriers associated with the attack roadmap, the plurality of malware carriers including the given malware carrier, the at least one additional malware carrier, and the at least one main malware module; and determining a sequence of execution of each one of the plurality of malware carriers based on a respective execution algorithm associated therewith; determining a respective malware class of each one of the plurality of malware carriers of the attack roadmap; generating a current list of indicators of compromise associated with each one of the plurality of malware carriers of the attack roadmap; searching a database to locate at least one stored attack roadmap including a plurality of stored malware carriers, the at least one stored attack roadmap being characterized by: at least some of the plurality of stored malware carriers of the at least one stored attack roadmap being of same respective malware classes as the plurality of malware carriers of the attack roadmap; and a sequence of execution of the at least some of the plurality of stored malware carriers matching, within a predetermined match threshold, the sequence of execution the plurality of malware carriers; retrieving from the database a stored list of indicators of compromise for each one of the plurality of stored malware carriers; generating an amalgamated list of indicators of compromise based on the current list of indicators of compromise and the stored digital list of indicators of compromise; storing, in the database, the amalgamated list of indicators of compromise associated with the given malware carrier and the at least one main malware module.

In some implementations of the method, the obtaining the given malware carrier comprises obtaining from an external computer security system.

In some implementations of the method, the execution of the at least one main malware module is triggered by execution of the at least one additional malware carrier, which is triggered by execution the given malware carrier.

In some implementations of the method, the detecting the at least one additional malware carrier of the plurality of malware carriers associated with the attack roadmap comprises: executing the given malware carrier in an isolated environment; and registering state changes of the isolated environment in response to the executing the given malware carrier therein.

In some implementations of the method, the attack roadmap is generated in a form of a graph, vertices of which are representative of the plurality of malware carriers, and edges of which are representative of the sequence of execution of the plurality of malware carriers.

In some implementations of the method, the determining the respective malware class of each one of the plurality of malware carriers comprises applying at least one pre-trained classifier.

In some implementations of the method, the generating the current list of indicators of compromise comprises executing each one of the plurality of malware carriers in a respective isolated environment configured for extracting associated indicators of compromise from a respective source code, and storing the associated indicators of compromise in a form of a list.

In some implementations of the method, the generating the current list of indicators of compromise comprises executing each one of the plurality of malware carriers in a respective isolated environment configured for registering state changes thereof in response to executing therein a respective one of the plurality of malware carriers; and storing data indicative of the state changes in a form of a list.

In some implementations of the method, the respective isolated environment is further configured for extracting, from a respective internal structure of the respective one of the plurality of malware carriers executed therein, associated indicators of compromise; and wherein the generating the current the list of indicators of compromise further comprises adding the associated indicators of compromise to data indicative of the state changes of the respective isolated environment.

In some implementations of the method, the retrieving from the database the stored list of indicators of compromise comprises applying at least one database fuzzy search algorithm.

In some implementations of the method, the method further comprises generating, a combined attack roadmap including the attack road map and the stored road map.

In some implementations of the method, to remove duplicates in the amalgamated list of indicators of compromise, the method further comprises applying one or more regular expressions.

In some implementations of the method, the method further comprises transmitting the current list of indicators of compromise to an external computer security system.

In accordance with a second broad aspect of the present technology, there is provided a system for identifying indicators of compromise. The system comprising: a processor and a non-transitory computer-readable memory storing instructions. The processor, upon executing the instructions, is configured to: obtain a given malware carrier configured for execution at least one main malware module; generate an attack roadmap by: detecting, based on the given malware carrier, at least one additional malware carrier, thereby forming a plurality of malware carriers associated with the attack roadmap, the plurality of malware carriers including the given malware carrier, the at least one additional malware carrier, and the at least one main malware module; and determining a sequence of execution of each one of the plurality of malware carriers based on a respective execution algorithm associated therewith; determine a respective malware class of each one of the plurality of malware carriers of the attack roadmap; generate a current list of indicators of compromise associated with each one of the plurality of malware carriers of the attack roadmap; search a database to locate at least one stored attack roadmap including a plurality of stored malware carriers, the at least one stored attack roadmap being characterized by: at least some of the plurality of stored malware carriers of the at least one stored attack roadmap being of same respective malware classes as the plurality of malware carriers of the attack roadmap; and
    a sequence of execution of the at least some of the plurality of stored malware carriers matching, within a predetermined match threshold, the sequence of execution the plurality of malware carriers; retrieve from the database a stored list of indicators of compromise for each one of the plurality of stored malware carriers; generate an amalgamated list of indicators of compromise based on the current list of indicators of compromise and the stored digital list of indicators of compromise; store, in the database, the amalgamated list of indicators of compromise associated with the given malware carrier and the at least one main malware module.

In some implementations of the system, the processor is configured to obtain the given malware carrier from an external computer security system.

In some implementations of the system, the execution of the at least one main malware module is triggered by execution of the at least one additional malware carrier, which is triggered by execution the given malware carrier.

In some implementations of the system, to detect the at least one additional malware carrier of the plurality of malware carriers associated with the attack roadmap, the processor is configured to: execute the given malware carrier in an isolated environment; and register state changes of the isolated environment in response to the executing the given malware carrier therein.

In some implementations of the system, the processor is configured to generate the attack roadmap in a form of a graph, vertices of which are representative of the plurality of malware carriers, and edges of which are representative of the sequence of execution of the plurality of malware carriers.

In some implementations of the system, to determine the respective malware class of each one of the plurality of malware carriers, the processor is configured to apply at least one pre-trained classifier.

In some implementations of the system, to generate the current list of indicators of compromise, the processor is configured to execute each one of the plurality of malware carriers in a respective isolated environment configured for extracting associated indicators of compromise from a respective internal structure, and storing the associated indicators of compromise in a form of a list.

Broadly speaking, malware applications may be combined in families. In the context of the present specification, a malware family is referred to as a plurality of malware applications intended to be used in attacks and united by a single functional purpose (downloaders, data stealers, etc.) and/or by a common team of developers as well as by a basic execution algorithm. The malware applications that make up one family differ from each other in various kinds of modifications, as a result of which, their publicly available characteristics, such as checksum, file size, file name, etc., are different. However, all malware applications included in one family are intended for the same purpose, and are configured to execute the same basic steps of the algorithm to achieve said purpose.

As it can be appreciated, there may be many different families of software applications of the same functionality. The difference between the families is that representatives thereof implement a given same function using different algorithms.

Below is a non-exhaustive list of families of malware carriers and main malware modules, which hereinafter are used as an example:

A data stealer is a malware application whose task is to steal a user's personal data. One of the well-known families of data stealers is called Pony.

A downloader is a malware application capable of downloading a file, typically another software application, from a certain web server. Attackers are known to use downloaders of the Nemucod family, as an example.

A crypter is a malware application whose task is to mask, by means of encryption, the fact that a distinct application is a malicious one. For example, one known crypter family is AtilaCrypter.

An exploit is a malware application whose task is to exploit a known vulnerability of a distinct, typically legitimate, software application, for example, Microsoft Word. By using exploits, attackers can use legitimate programs to attack. For example, a known exploit exploits the CVE-201711882 vulnerability thereby enabling a third-party malware application penetrate a Microsoft Word document.

This list is not exhaustive and is used only to illustrate the described method; the names of malware carriers and main malware modules herein are given as examples. Thus, other malware carriers and main malware modules can be used without departing from the scope of the present technology.

It should be noted that there is also multifunctional malware capable of performing functions, for example, of a downloader, crypter and data stealer. Such malware is typically classified into the family to which a most dangerous function it performs belongs.

between the training set of data and the plurality of users.

In the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF DRAWINGS

Non-limiting embodiments of the present technology will be described with reference to the accompanying drawings, which are presented to explain the essence of the invention and in no way to limit the scope of the present technology, wherein.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to a method of identifying indicators associated with a complex attack in a digital system based on at least one malware carrier identified therein.

In some non-limiting embodiments of the present technology, a given malware carrier may comprise a file intended for the complex attack on the digital system. In some non-limiting embodiments of the present technology, the digital system may be represented by a network infrastructure including hardware and software associated with a given network, further including, without limitation a LAN, a WAN, and the like.

Further, in some non-limiting embodiments of the present technology, the given malware carrier may typically comprise, in an encrypted form, a main malware module of the complex attack, which implements the ultimate goal thereof, and one or more auxiliary malware carrier applications that can be configured for execution of the main malware module from a designated web server or otherwise prepare same for operation (for example, decryption is performed).

Figure 1A:
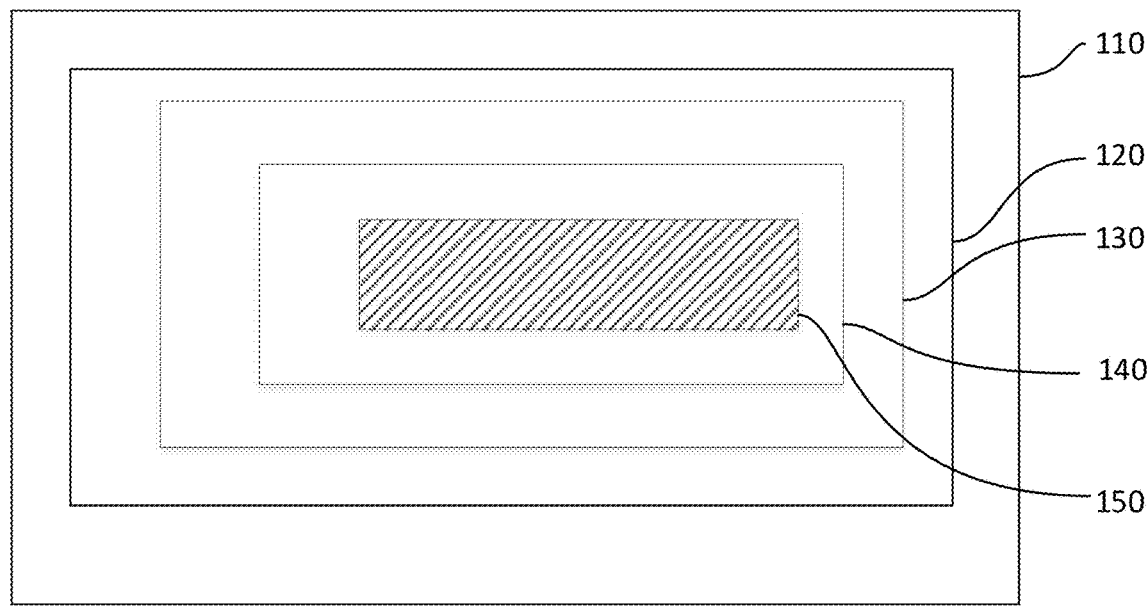
FIGS. 1A-1B depict an example structure of a malware carrier and an example algorithm for a complex attack, in accordance with certain non-limiting embodiments of the present technology.

With reference to FIG. 1A, there is schematically depicted an example structure of a malware carrier 100, in accordance with certain non-limiting embodiments of the present technology. In this example, the malware carrier 100 may include an exploit 110 configured for embedding in a Microsoft Word document and exploiting a vulnerability therein. For example, the vulnerability may be a CVE-201711882 vulnerability associated with the Microsoft Word application.

More specifically, upon opening of the infected document on a user device, the exploit 110 may be configured to store an encrypted file on a hard drive of the user device and launch a crypter application 120 including, for example, a crypter from the AtilaCrypter family. The latter may be configured to decrypt the encrypted file containing a downloader 130 belonging, for example, to the Nemucod downloader family. Referring to the address stored in the code thereof, the downloader 130 may be configured to download another encrypted file from the attacker's C&C server and execute another crypter 140, for example, HabibCrypter, to decrypt the other encrypted file. After decrypting the downloaded file, the main malware module 150 can thus be launched, which may include, for example, a data stealer of the Pony family.

Figure 1B:
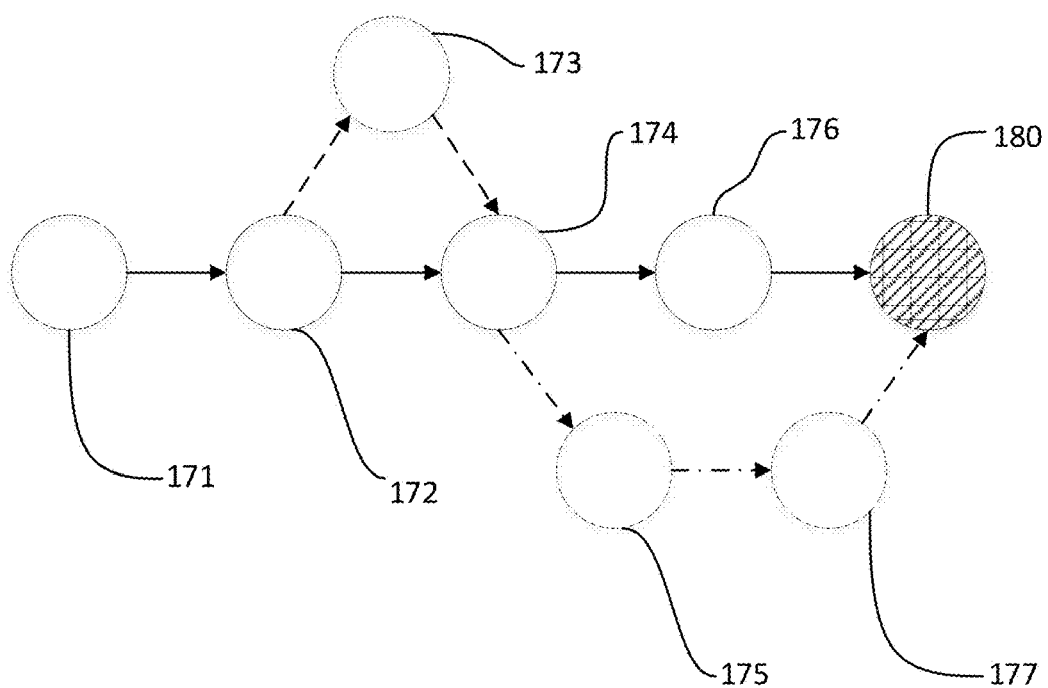

Thus, the complex attack can be implemented, an attack roadmap 170 in a form of a graph of which is schematically depicted in FIG. 1B, in accordance with certain non-limiting embodiments of the present technology. According to the attack roadmap 170, execution 171 of the exploit 110 triggers the execution 172 of the crypter 120 triggering the execution 174 of the downloader 130, which further triggers execution 176 of the second crypter 140, and finally, the execution 180 of the main malware module 150 is executed.

In alternative non-limiting embodiments of the present technology, depending on parameters of the environment in which the complex attack is performed, after the execution 172 of the crypter 120, execution 173 of another crypter can be performed, thereafter the complex attack continues to develop in accordance with the previously described attack roadmap 170.

In other non-limiting embodiments of the present technology, the downloader 130 may execute the loading 175 of an alternative version of the encrypted main malware module 150 and additional unpacking 177 thereof by the second crypter 140. In this case, just as in the previous one, the development of the complex attack ends with the execution 180 of the main malware module 150; however, the main malware module 150 itself may be of a different configuration, that is, in the present example, may not be a data stealer of the Pony family.

It should be noted that alternative paths of the attack roadmap 170 (graph) 173 and 175-177 may be used by the complex attack along with a main path shown by steps 172-174-176. When implementing such an attack on an extensive network infrastructure comprising a plurality of elements (routers, computers, servers, IOT devices, etc.), it is possible that on some devices the complex attack may evolve using the path 173, on some others the attack may evolve using the path 175-177, and on some others the complex attack may evolve according to the main path of the graph 172-174-176. As a result, different elements of the network infrastructure may be compromised by different means and may, therefore, contain different sets of indicators of compromise that do not fully match.

It should be further noted that the malware carrier 100 and the attack roadmap 170 thus developed is depicted merely for ease of understanding. In other examples, the number of steps, such as steps 171, 172, 173, etc., may be much greater. There may be significantly more alternative paths of the attack roadmap 170, such as alternative paths 173 and 175-177.

Method

Figure 2:
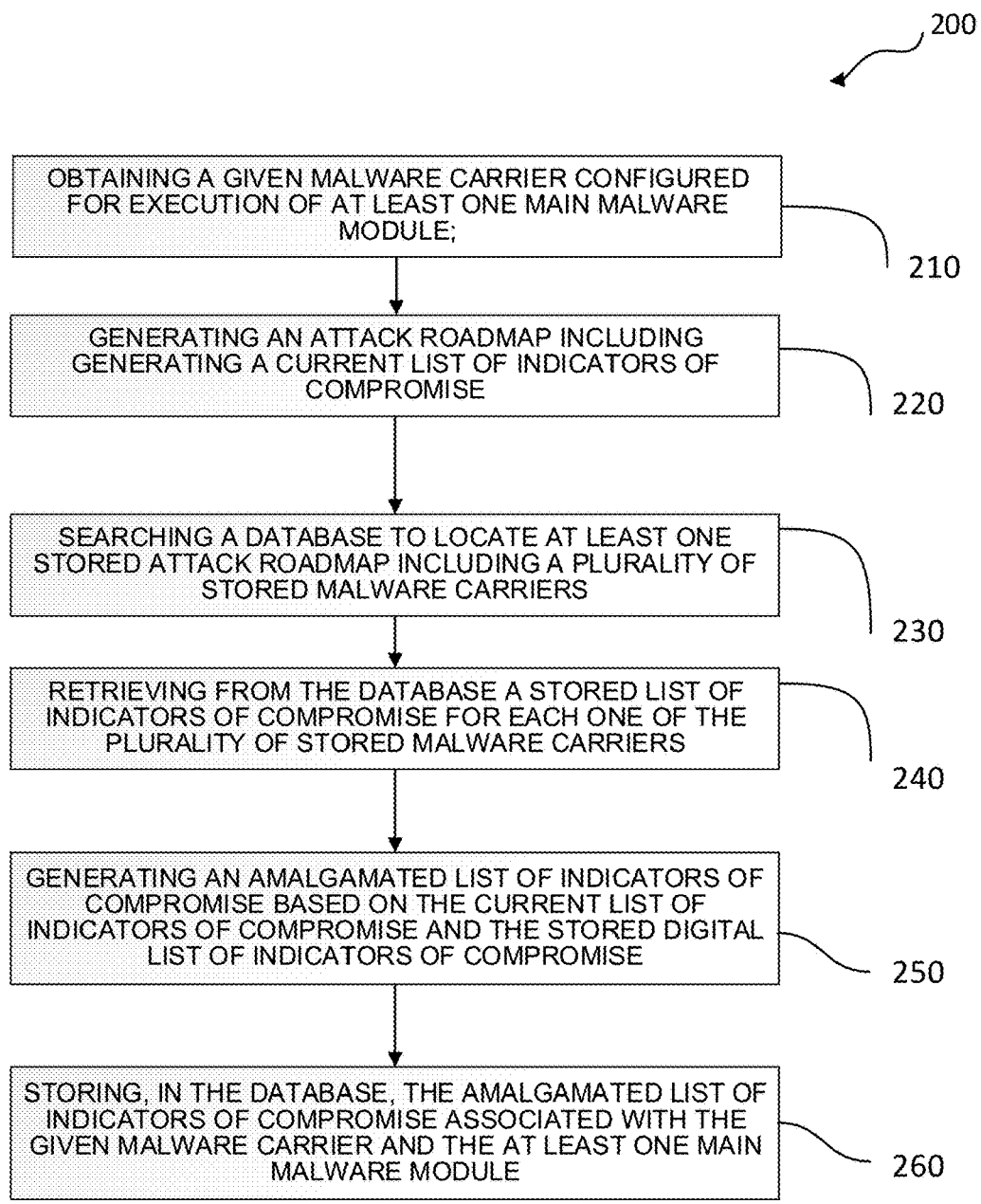
FIG. 2 depicts a flowchart of a method for identifying indicators of compromise in a digital system in accordance with certain non-limiting embodiments of the present technology.

With reference to FIG. 2, there is depicted a flowchart diagram of a method 200 of identifying indicators of compromise generated by the digital system in response to the complex attack performed therein, in accordance with certain non-limiting embodiments of the present technology. The method 200 may be executed by a server including a computing environment 500, further including a processor 501, which will be described below with reference to FIG. 5.

Step 210: Obtaining a Given Malware Carrier Configured for Execution of at Least One Main Malware Module According to certain non-limiting embodiments of the present technology, the method 200 commences at step 210 with the processor 501 being configured to obtain a file including the given malware carrier, such as, for example, the malware carrier 100 depicted in FIG. 1A. The given malware carrier may be, for example, an e-mail containing a malicious attachment, for example, a Microsoft Word document infected with an exploit that exploits the CVE-2017-11882 vulnerability. Such an e-mail may be sent, for example, to the e-mail address used by the described system as "input" one.

In other non-limiting embodiments of the present technology, the given malware carrier may be any other file, for example, a script or other executable file, pre-prepared by attackers for complex attacks on the network infrastructure. Such a file may be placed in a specifically dedicated and shared editable folder of a local network associated with the server. To that end, the processor 501 may be configured to check, with a certain frequency, for example, once a minute, whether new files have been uploaded to the folder, and, when they are uploaded, automatically start processing them as described below.

In yet other non-limiting embodiments of the present technology, the file including the given malware carrier may be uploaded via a web form disposed on a website hosted by the server.

In yet other non-limiting embodiments of the present technology, the processor 501 may be configured to obtain the given malware carrier from an external source, for example, from one of a plurality of computer systems for security incident analysis including, for example, without limitation, TDS Polygon™. In yet other non-limiting embodiments of the present technology, the given malware carrier may be sent or transferred to the server by the above methods by an employee of the cybersecurity department involved in investigating an incident of compromising the network infrastructure resulted in performing the complex attack.

The method 200 thus proceeds to step 220.

Step 220: Generating an Attack Roadmap Including Generating a Current List of Indicators of Compromise At step 220, according to some non-limiting embodiments of the present technology, the processor 501 may be configured to generate, based on the given malware carrier, an attack roadmap by determining a sequence of execution of other malware carriers and, finally, the main malware module of the complex attack. To that end, the processor 501 may be configured to determine at least one path which defines the execution of the given malware carrier obtained at step 210 (such as execution of the malware carrier 171 in FIG. 1B) to the execution of the main malware module (such as execution of the main module 180 in FIG. 1B) of the complex attack.

Thus, according to certain non-limiting embodiments of the present technology, the processor 501 can be configured to detect, based on the at least one path, at least one additional malware carrier, different from the given malware carrier, thereby forming a plurality of malware carriers of the attack roadmap associated with the complex attack.

According to certain non-limiting embodiments of the present technology, the generating the attack roadmap may further comprise the following sub-steps of:

determining a respective malware class of each of the given malware carrier and the main malware module, that is determining their affiliation with a certain family and/or team of malware developers; and generating a current list of indicators of compromise associated with each detected malware carrier or main malware module.

The sub-steps performed at step 220 will be described in more detail below with reference to FIG. 3.

The method 200 thus proceeds to step 230.

Step 230: Searching a Database to Locate at Least One Stored Attack Roadmap Including a Plurality of Stored Malware Carriers At step 230, according to some non-limiting embodiments of the present technology, the processor 501 can be configured to use the attack roadmap generated at step 220 to search a database of attack roadmaps to locate at least one stored attack roadmap that matches, with a predetermined level of accuracy, the attack roadmap compiled at step 220.

In the context of the present specification, "matching with a predetermined level of accuracy" denotes a partial overlap between the attack road map generated at step 220 and the at least one stored attack roadmap. For example, if the at least one stored attack roadmap includes at least 3 steps, such as steps 171, 174, 180 shown in FIG. 1B, which are identical to the steps in the attack roadmap compiled at step 220 and performed in the same sequence, the processor 501 can be configured to identify the at least one stored attack roadmap as matching the attack roadmap.

How the processor 501 can be configured to execute the step 230, according to certain non-limiting embodiments of the present technology, will be described in more detail below with reference to FIGS. 4A-4B.

The method 200 hence advances to step 240.

Step 240: Retrieving from the Database a Stored List of Indicators of Compromise for Each One of the Plurality of Stored Malware Carriers At step 240, according to certain non-limiting embodiments of the present technology, the processor 501 may be configured to retrieve a stored list of indicators of compromise corresponding to the at least one stored attack roadmap from the database of attack roadmaps, that is, at least one database record containing information about an earlier complex attack associated with the at least one stored attack roadmap. The stored list of indicators of compromise including indicators of compromise associated with at least one malware carrier and/or main malware module of the earlier complex attack could have been pre-stored in the database of attack roadmaps in the course of performing investigations similar to those described above in relation to steps 210-220.

In other words, to generate the database of attack roadmaps used in method 200, a preliminary work is performed by investigating various malware carriers that implement complex attacks and by storing the obtained attack roadmaps and lists of indicators of compromise associated therewith. Alternatively or additionally, the database of attack roadmaps used in the method 200 may be supplemented with data automatically obtained from open sources, such as websites that aggregate lists of indicators of compromise corresponding to different malware families.

The method 200 thus proceeds to step 250.

Step 250: Generating an Amalgamated List of Indicators of Compromise Based on the Current List of Indicators of Compromise and the Stored Digital List of Indicators of Compromise At step 250, based on the current list of indicators of compromise generated at step 220 and the stored list of indicators of compromise retrieved from the database of attack roadmaps at step 240, the processor 501 can be configured to generate an amalgamated list of indicators of compromise. During the below described operations with the lists, each indicator of compromise is considered a text string.

In some non-limiting embodiments of the present technology, the processor 501 can be configured to generate the amalgamated list of indicators of compromise by merging the current list of indicators of compromise with the stored list of indicators of compromise retrieved from the database. The merging of the lists is performed in accordance with a logical OR procedure and may include checking whether each new line from the stored list of indicators of compromise matches any of the lines of the current list of indicators of compromise. If the processor 501 detects exact duplicate lines, the processor 501 can be configured to ignore such lines (they are not included in the amalgamated list of indicators of compromise). In cases where a string being checked does not have a full match in the list compiled at step 220, such a string is added to the general list of indicators of compromise.

In other non-limiting embodiments of the present technology, the processor 501 can be configured to generate the amalgamated list of indicators of compromise using regular expressions. Exact duplicate of indicators of compromise are ignored, similar to the above-described embodiments. Further, the processor 501 can be configured to include, using the regular expressions, in the amalgamated list of indicators of compromise lines that match by more than N symbols, where N is a predetermined number, whose value has been determined experimentally.

For example, if four strings found in the stored list of indicators of compromise look as follows:

C:\Users\John\123.txt
C:\Users\Mary\123.txt
C:\Users\Rosencrantz\123.txt.
C:\Users\Guildenstern\123.txt then, in accordance with certain non-limiting embodiments of the present technology, the processor 501 can be configured to include in the amalgamated list of indicators of compromise the following line:

C:\\Users\\.*?\\123\.txt.

The method 200 thus proceeds to step 260.

Step 260: Storing, in the Database, the Amalgamated List of Indicators of Compromise Associated with the Given Malware Carrier and the at Least One Main Malware Module At step 260, the processor 501 can be configured to store the attack roadmap and the current list of indicators of compromise generated at step 220, and the amalgamated list of indicators of compromise generated at step 250, in the database of attack roadmaps. Further, the processor 501 can be configured to transfer the amalgamated list of indicators of compromise to an external system, for example, to the system for computer security incident analysis.

In some non-limiting embodiments of the present technology, at step 260, the processor 501 can be configured to store a combined graph 490 of the complex attack as described below with reference to FIG. 4B.

The method 200 thus terminates.

Generating Attack Road Map

Figure 3:
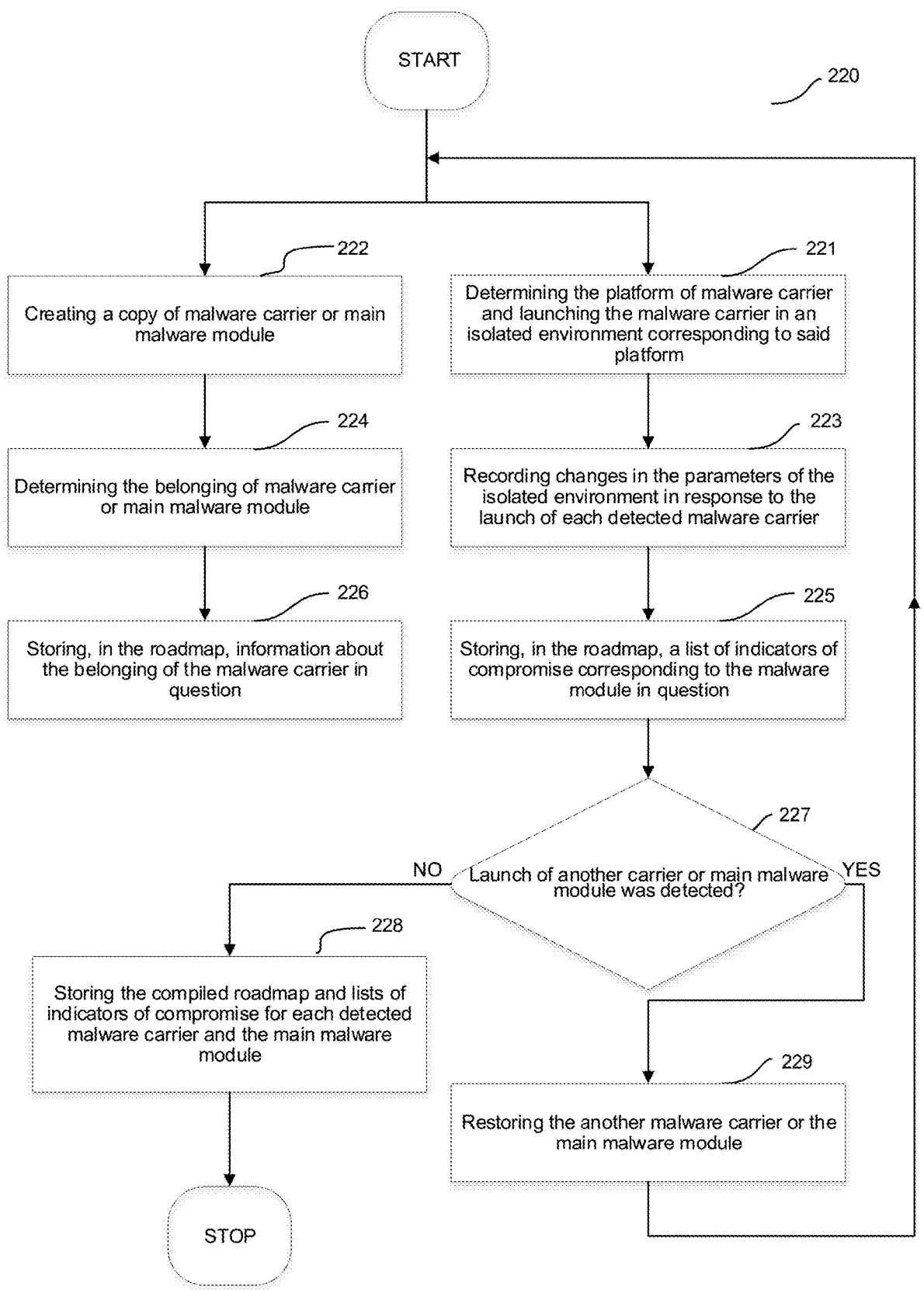
FIG. 3 depicts a flowchart of a step of the method of FIG. 2 for generating an attack roadmap, in accordance with certain non-limiting embodiments of the present technology.

With reference to FIG. 3, there is depicted a flowchart diagram of example execution, by the processor 501, of step 220 of the method 200, in accordance with certain non-limiting embodiments of the present technology.

In some non-limiting embodiments of the present technology, the processor 501 can be configured to execute step 220 at sub-step 221, where the processor 501 can be configured to determine a malware carrier platform of the given malware carrier obtained earlier. Further, the processor 501 can be configured to execute the given malware carrier in an isolated environment corresponding to the determined malware carrier platform.

The malware carrier platform in this case is an environment in which the investigated software (the given malware carrier) is to be executed. The malware carrier platform may include both hardware (for example, RAM, hard disk) and software (BIOS, operating system, etc.). The malware carrier platform may be determined, for example, by brute-force search: the given malware carrier is executed one by one in various isolated environments, each of which is configured so as to correspond to a certain malware carrier platform, and information is stored about on which malware carrier platform the given malware carrier has been successfully launched. For example, one can establish in this manner that the given malware carrier is configured to be executed on the Win32 platform.

Thus, the processor 501 can be configured to execute the given malware carrier in the isolated environment associated therewith simulate, for example, the operation of a personal computer.

The isolated environment can be pre-configured such that execution stops at a moment when the operation of the given malware carrier is finished, and when the given malware carrier attempts to execute the at least one additional malware carrier and/or the main malware module.

Furthermore, since a target of the given malware carrier may not be known in advance, the isolated environment may be further configured so as to simulate elements of the network infrastructure available on the local network, for example, a router, WiFi router, etc. This may be implemented in any suitable manner, for example, by organizing the so-called honey-pots, the properties of which correspond to the simulated elements of the network infrastructure.

The execution of step 220 then proceeds to sub-step 223 where the processor 501 can be configured to register changes in parameters and/or states of the isolated environment in response to the execution of the given malware carrier.

Thus, at sub-step 225, the processor 501 can be configured to store the current list of indicators of compromise resulting from the recording of changes in parameters of the isolated environment in the database of attack roadmaps.

In additional non-limiting embodiments of the present technology, the processor 501 can be configured to execute sub-step 224, at which indicators of compromise are retrieved from each one of the plurality of malware carriers by execution thereof in one or more respective isolated environments configured for retrieval of the indicators of compromise from associated internal structures of each one of the plurality of malware carriers. This method for retrieval is based on the premise that internal structure of some malware carriers may contain some indicators of compromise, for example, the addresses of web servers for loading another carrier or the addresses of the file system folders where files should be created. The retrieval thereof may be performed by a pre-prepared script that provides access to some previously known addresses of the internal structure of a given malware carrier and retrieves said indicators of compromise. The processor 501 can further be configured to add the indicators of compromise identified at sub-step 224 to the current list of indicators of compromise.

Further, the processor 501 can be configured to execute, in parallel with steps 221-225, sub-steps 222-226. At sub-step 222, the processor 501 can be configured to create a copy of the given malware carrier (or the main malware module).

Further, at sub-step 224, the processor 501 can be configured to determine an affiliation of the given malware carrier with a certain malware family or team of malware developers is determined. To that end, the processor 501 can be configured to execute, for example, a method for determining the affiliation of the given malware carrier based on a machine code thereof. In specific non-limiting embodiments of the present technology, the processor 501 can be configured to apply one or more methods described in a co-owned U.S. patent application Ser. No. 17/087,775 filed on Nov. 3, 2020, entitled "METHOD AND SYSTEM FOR DETERMINING AFFILIATION OF SOFTWARE TO SOFTWARE FAMILIES", the entirety of which is hereby incorporated by reference. More specifically, the processor 501 can be configured to execute, the preparatory step: obtaining a file comprising the malware machine code; determining the format of the file obtained; retrieving and storing the code of the functions present in the file obtained; removing from the stored code the functions that are library functions; identifying the commands in each function; identifying an "action, argument" pair in each command; converting each "action, argument" pair to an integer; storing, separately for each selected function, the resulting sequence of integers; accumulating a predetermined number of the results of the analysis of the machine code; identifying repeating sequences of integers (patterns) in the results of the analysis of the machine code; for each identified pattern, calculating a parameter that characterizes the frequency thereof; storing the predetermined number of patterns and, based on the set of parameters calculated for each pattern, training at least one classifier to determine the belonging of software by the sequence of "action, argument" pairs. In the course of sub-step 224, the at least one trained classifier is applied to subsequently determine the affiliation of the given malware carrier with a certain software family.

In alternative non-limiting embodiments of the present technology, the processor 501 may be configured to determine the affiliation of the given malware carrier with a respective malware family or a team of malware developers by searching for characteristic code fragments in the code of the given malware carrier, executed by means of a script pre-created for this purpose. Said script can detect the presence, in previously known places in the code, of code fragments characteristic of the certain malware family. Such fragments, which may become a "signature" of the certain malware family, are well known to those skilled in the art. They can be pre-assembled, for example, in a database, before executing the method 200, and used to search by code of the given malware carrier.

It should be noted that the processor 501 may fail to determine the affiliation of the given malware carrier with the certain malware family. This may be the case, for example, if the attackers used a fundamentally new malware in preparing the complex attack, which has not been used before and does not have the characteristic features of any family. Thus, in these non-limiting embodiments of the present technology, it is then assumed that all malware whose malware family cannot be determined is referred to a "general family" of malware. The general malware family unites all malware that has not been identified as belonging to any malware family.

Finally, at sub-step 226, the information about the affiliation of the given malware carrier is stored in the database of attack roadmaps, with relation to the attack roadmap. As a result of sub-steps 222-226, the processor 501 can expand the attack roadmap with one or more additional steps, such as, referring back to FIG. 1B, step 171, step 172, or step 180.

In various alternative non-limiting embodiments of the present technology, sub-steps 222-226 may be performed before sub-steps 221-225, or vice versa.

Furthermore, in some non-limiting embodiments of the present technology, the current list of indicators of compromise generated at sub-steps 221-225 for the given malware carrier can be stored in the database, with relation to the attack roadmap in association with the so determined malware family or a team of malware developers, the affiliation with which has been determined in the course of sub-steps 222-226. In other words, the obtained current list of indicators of compromise may be combined with or added to the stored lists of indicators of compromise available in the database for malware of the determined malware family.

As the isolated environment in which sub-steps 221-225 are performed can be pre-configured such that the execution stops at the moment of the end of operation of the given malware carrier, the method then proceeds to sub-step 227, at which the processor 501 can be configured to check whether the given malware module attempted to launch the at least one additional malware carrier and/or the main malware module.

It may be apparent that an attempt to launch a new module is typically associated with certain predetermined changes in the state of the isolated environment, which the processor 501 can be configured to register. For example, as applied to the Win32 platform, these are certain sequences and parameters of the invoked system APIs.

Lists of such sequences and parameters may be prepared in advance, and the fact of detection of one or more previously known sequences may be interpreted as detection of an attempt to launch another malware carrier or main malware module.

For example, to register the changes of the state of the isolated environment, the processor 501 can be configured to execute logging (recording the environment changes in text form), hooks, etc., the above detection of an attempt to launch the at least one additional malware carrier and/or main malware module.

CreateRemoteThread for the Win32 platform, the Invoke method for the .net platform, etc. are non-limiting examples of a detection criterion. Accordingly, the reason for stopping execution in the first case is the appearance of a sequence of calls:

OpenProcess-GetProcAddress-VirtualAllocEx-WriteProcessMemory-CreateRemoteThread.

If no such attempt is detected at sub-step 227, which corresponds to the end of development of the complex attack (end of step 180 in FIG. 1B), then the method 200 proceeds directly to sub-step 228, at which the processor 501 can be configured to generate and store the attack roadmap, as well as the current list of indicators of compromise associated with each one of the plurality of malware carriers are stored.

As it may be appreciated from FIG. 1B, at this point, by performing the sub-steps described above, the entire sequence of execution of the malware carriers 171, 172, 174, 176 and main malware module 180, as well as information about the affiliation of each of said carriers and the main module to a respective malware family is obtained (determined). In addition, by this point, a list of indicators of compromise has been obtained for each of said objects to generate the current list of indicators of compromise.

Thus, by the end of sub-step 228, the attack roadmap may obtained, that is, a graph whose vertices are representative of respective malware carriers and main malware module used by the attackers, and the edges represent the sequence of execution of said carriers and module. Further, each used malware carrier and/or the main malware module corresponds to the list of indicators of compromise that are characteristic of the execution thereof. All of the information provided may be stored, by the processor 501, in the database of attack roadmaps, for example, hosted by the server.

The end of sub-step 228 means the end of compiling the attack roadmap, and the method 200, generally described with reference to FIG. 2 above, proceeds, as mentioned above, to step 230.

In the event that at sub-step 227, an attempt by the malware carrier investigated at sub-steps 221-225 to launch another malware carrier or main malware module is detected (which means that the development of the complex attack has not yet been finished, and the attack roadmap has not been fully compiled), then the method 200 proceeds to sub-step 229, at which the processor 501 can be configured to restore detection of an other additional malware carrier, which the given malware carrier attempted to launch.

Restoration herein means compiling of a unit of software from the code and data available in the memory, for example, an executable file, which can be launched on a corresponding platform. From the code and data of another malware carrier or main malware module available in the memory, at sub-step 229, the processor 501 can be configured to restore the other additional malware carrier and transformed into a form that allows execution thereof on a corresponding platform.

The restoration can be performed in any suitable manner, for example, by means of the Scylla software. A detailed description of the restoration itself is not provided, since approaches and methods of implementation thereof may be apparent to a person skilled in the art.

Thereafter, the processor 501 can be configured to transfer the restored other additional malware carrier to the input of the above-described execution of step 220 of the method 200. In other words, the execution of sub-steps 222 and 221 for the newly restored other additional malware carrier or the main malware module may further be initiated.

Further, if and when during the execution of the given malware carrier, it is determined, for example, by means of honey-pots created in the isolated environment, that the attack target (the place of the intended execution of the restored malware carrier) thereof is directed not at, for example, a personal computer simulated in this isolated environment, but, for example, at a router, then the restored other additional malware is placed in an isolated environment with settings that simulate a router or, more generally, a newly identified attack target.

As it may be appreciated, the above-described step 220 of generated the attack roadmap is executed cyclically until it is determined at sub-step 227 that there has been no attempt to launch another malware carrier or the main malware module. This corresponds to the end of the unfolding of the complex attack, that is, with reference to FIG. 1B, the end of the entire sequence of execution of the malware carriers 171, 172, 174, 176, as well as the end of execution of the main malware module 180.

Thus, by executing the given malware carrier in the isolated environment, the processor 501 can be configured to detect the at least one additional malware carrier and/or the main malware module, thereby forming the plurality of malware carriers associated with the attack roadmap.

Thus, the processor 501 may be said to simulate the unfolding of the complex attack; identifying indicators of compromise for each of the steps of the complex attack, as well as determining affiliation of each of the plurality of malware carriers with the respective malware family.

Generating a Combined Attack Roadmap

Figure 4A:
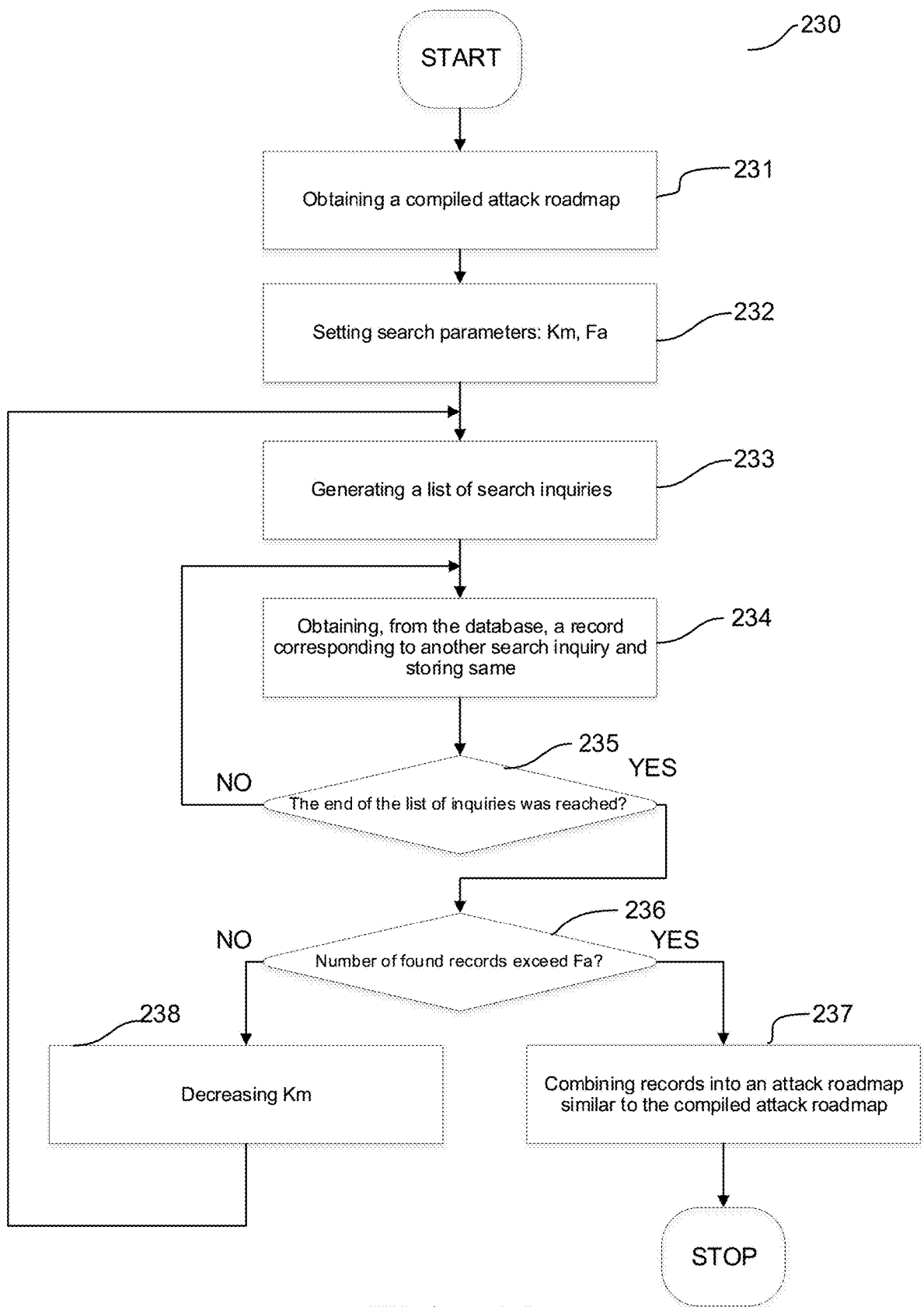
FIGS. 4A-4B depicts a schematic diagram of a step of the method of FIG. 2 for matching an example attack roadmaps to the attack roadmap generated in accordance with the method of FIG. 3, in accordance with certain non-limiting embodiments of the present technology.
Figure 4B:
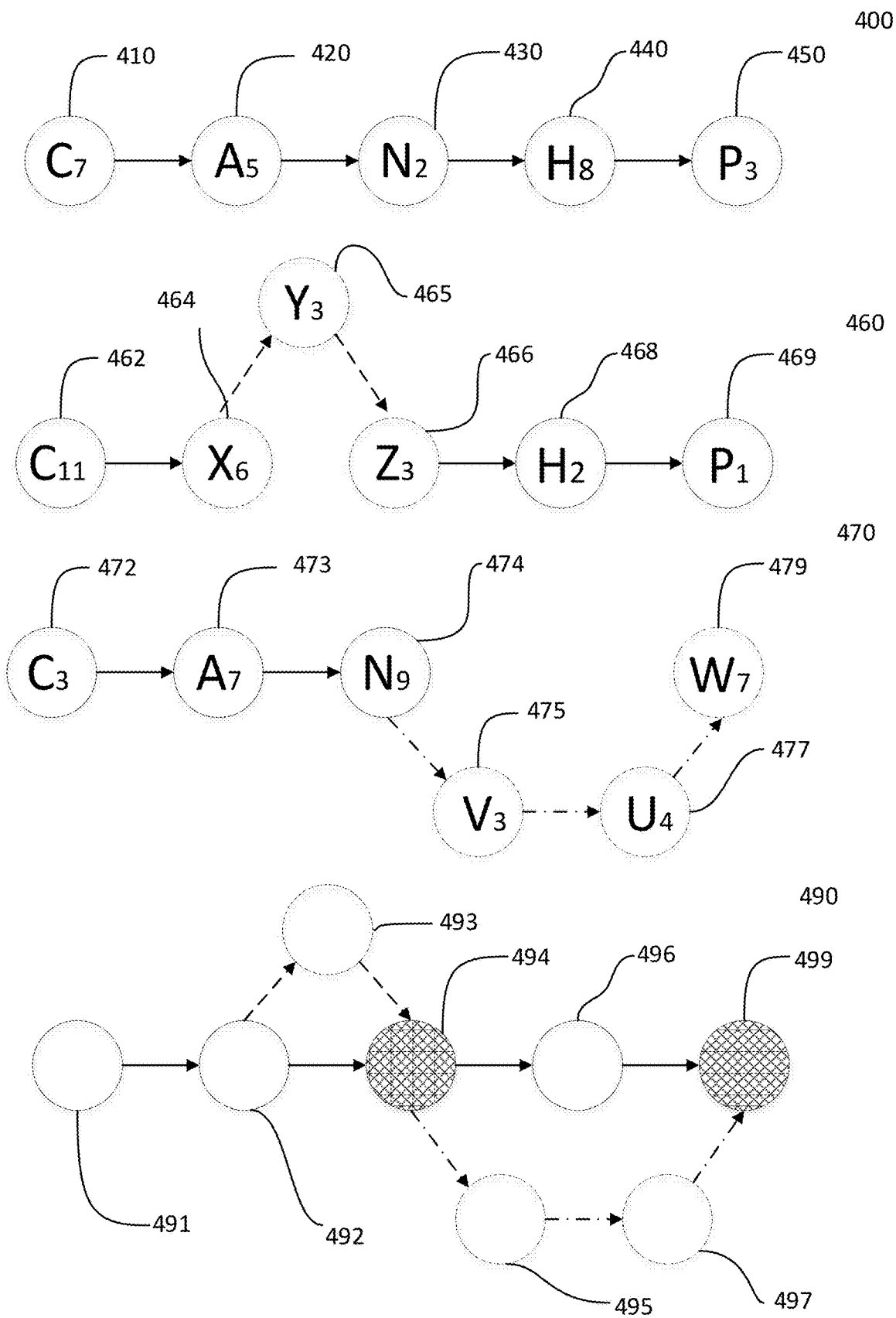

With reference to FIGS. 4A-4B, there is depicted a flowchart diagram of execution, by the processor 501, of step 230 of the method 200 described above, in accordance with certain non-limiting embodiments of the present technology. As mentioned above, at step 230, the processor 501 can be configured to locate, in the database of roadmaps, the at least one stored attack roadmap matching, with a predetermined level of accuracy, that generated at step 220. Referring first to FIG. 4A, the execution of step 230 starts with obtaining, at sub-step 231, the attack roadmap generated at step 220.

For example, the attack roadmap obtained at sub-step 231 can be represented in a form of a first graph 400, as depicted in FIG. 4B, in accordance with certain non-limiting embodiments of the present technology. Vertices of the first graph 400 can, for example, be respectively representative of an exploit 410, a crypter 420, a downloader 430, a crypter 440, and a data stealer 450, which have been detected at step 220 described above with reference to FIG. 2. Edges of the first graph 400 correspond to an order of executing each one of the plurality of malware carriers of the attack roadmap.

As it can be appreciated form the first graph 400, the exploit 410 includes an indication C7 indicative of the exploit 410 being is a seventh representative of an exploit family that exploits the CVE-201711882 vulnerability. Similarly, the crypter 420 is labelled A5, which means that it is a fifth representative of an AtilaCrypter family, the downloader 430 is a second representative of a Nemucod family, the crypter 440 is an eighth member of a HabibCrypter family, and the main malware module, the data stealer 450, is a third representative of the Pony family. The affiliations of each one of the plurality of malware carriers with associated malware families, as by way of example explained above, has been also determined by the processor 501 at sub-step 224 of the execution of step 220 described above with reference to FIG. 3.

In alternative non-limiting embodiments of the present technology, the attack roadmap may be obtained in a form of a list in which the order of listing of the malware families corresponds to the detected order of execution of respective ones of the plurality of malware carriers, and a number in brackets corresponds to an ordinal number of a given one of the plurality of malware carriers in respective malware family. An example of such a list, that is similar in meaning to the first graph 400, may look as follows:

CVE-201711882 (7), AtilaCrypter (5), Nemucod (2), HabibCrypter (8), Pony (3)

Thus, it should be noted that it is not limited in which form the attack roadmap can be obtained by the processor 501, and may include any other alternative ways of representing the attack roadmap allowing indicating the order of execution of each one of the plurality of malware carriers, the respective malware families thereof, as well as ordinal numbers and/or any other identifiers thereof within the respective malware families.

Accordingly, "search for a stored attack roadmap" herein refers to the search, in the database of attack roadmaps, for graphs, rows, vectors, tables, matrices, sets, or any other database records, depending on the representation method used, that comply with the desired search conditions. In some non-limiting embodiments of the present technology, the processor 501 an be configured to apply at least one database fuzzy search algorithm to the database of attack roadmaps, as will be described below.

For ease of describing the subsequent steps, the given one of the plurality of malware carriers represented within the first graph 400 in FIG. 4B, is hereinafter referred to "a vertex A1", where the letter A refers to the respective malware family, and the numeric index 1 refers to a certain identifier of the given one of the plurality of malware carriers within the respective malware family thereof, which can be, for example, a serial number of the given one of the plurality of malware carriers. Thus, in accordance with this principle, A1 and A2 are different representatives of a same family, A, whereas A2 and B2 are representatives of different families, A and B. Accordingly, labelling Ax is used to refer to "any member of the A family".

Returning to FIG. 4B, the execution of the step 230 then proceeds to sub-step 232, at which the processor 501 can be configured to obtain database search parameters. In some non-limiting embodiments of the present technology, the database search parameters may comprise a minimum total number of different database records to be found during the search, Fa, and a minimum number of vertices, Km, to match the vertices of the attack roadmap. For example, the processor 501 can be configured to obtain the following parameters: find at least Fa=100 distinct records, wherein each record contains at least Km=4 matching vertices.

According to certain non-limiting embodiments of the present technology, the matching of vertices may include identifying vertices affiliated with a same malware family. For example, vertices A1, A4 and A9 match, but A1 and B1 do not.

In some non-limiting embodiments of the present technology, the database search parameters may further comprise a conditions of a same order between vertices of the first graph 400 associated with the attack map and the searched one. In other words, if the vertices Ax, Bx, Cx are disposed sequentially in the roadmap obtained at sub-step 231, then the records comprising the sequences Ax, Cx, Bx or Bx, Ax, Cx are not selected during the search.

In other non-limiting embodiments of the present technology, the above search condition is not set, and all records comprising the vertices Ax, Bx and Cx are selected, regardless of the order in which these vertices appear in the record.

In yet non-limiting embodiments of the present technology, the database search parameters may further include a parameter P indicative of a maximum number of vertices that can be disposed between matching vertices, for example if P=2, then during the search, for example, of the vertices Ax and Bx, all records may be selected in which Ax and Bx are present and there can be one or two other vertices positioned therebetween.

Alternatively, the P parameter may be predetermined to be equal to infinity, and then all records comprising Ax and Bx are selected, regardless of how many and which vertices are therebetween.

As noted above with respect to sub-step 224 of the execution of step 220, all malware carriers that could not be attributed to any malware family are attributed to the "general malware family". Thus, in some non-limiting embodiments of the present technology, during the search 230 for the at least one stored attack roadmap matching the attack roadmap, those of the plurality of malware carriers of the attack roadmap that are assigned to the "general malware family" are discarded. In other words, if in the first graph 400 of the attack roadmap there is a graph vertex belonging to the "general family", during the search it is assumed that this vertex is not present in the first graph 400, and the vertex preceding it can further be directly connected to a next one.

In alternative non-limiting embodiments of the present technology, malware carriers associated with the "general malware family" can be processed similarly to the those of identified malware families.

Further, the execution of the step 230 proceeds to sub-step 233, where the processor 501 can be configured to generate a list of search inquiries using the previously determined database search parameters including at least one of Fa, Km, and P, and the attack roadmap.

In this regard, the processor 501 can be configured to conduct the search covering the full ensemble of all possible combinations of vertices present in the attack roadmap, taking into account the database search parameters set at step 232.

For example, with continued reference to FIG. 4B, the processor 501 can be configured to obtain the following database search parameters for the attack roadmap represented by the first graph 400:

the minimum number of records to be found, F=2,
the number of matching vertices, Km=3,
the number of other vertices that can be present between the matching vertices, P is equal to infinity,
No random ordering of matching vertices is allowed.

Thus, based on the first graph 400 including the sequence of vertices C7-A5-N2-H8-P3, taking into account the set conditions, the processor 501 can be configured to generate the search inquiries including the following combinations and sequences of vertices:

CxAxNx, CxAxHx, CxAxPx, CxNxHx, CxNxPx, CxHxPx, AxNxHx, AxNxPx, AxHxPx, NxHxPx.

In other non-limiting embodiments of the present technology, the processor 501 can be configured to generate the search inquiries in the form of regular expressions. For example, in accordance with the above database search parameters, the following regular expressions can be generated and used to search for the above sequences and combinations of vertices:

.?Cx.?Ax.?Nx.
.?Cx.?Ax.?Hx.
.?Cx.?Ax.?Px.
.?Cx.?Nx.?Hx.
.?Cx.?Nx.?Px.
.?Cx.?Hx.?Px.
.?Ax.?Nx.?Hx.
.?Ax.?Nx.?Px.
.?Ax.?Hx.?Px.
.?Nx.?Hx.?Px.

As it may become apparent from the given example, due to the relatively small length of the attack roadmap, as well as the value of the parameter Km=3, the number of possible combinations of search inquiries is small. For other values of these parameters, the number of required combinations of search inquiries may be much greater, therefore, the generation of the list of inquiries is performed automatically by means of a pre-prepared script that receives, to the input, a sequence of vertices of the attack roadmap and the values of database search parameters, such as Km, and provides, at the output, the list of search inquiries generated for the indicated given sequence of vertices and the given parameters.

It should be noted that depending on the architecture of the database of attack roadmaps, the way of representing the attack roadmaps, etc., any other methods and syntax for generating the list of search inquiries may be used without departing from the scope of the present technology.

Upon the completion of sub-step 233, the execution of the step 230 proceeds to looping through sub-steps 234 and 235. At sub-step 234, the processor 501 can be configured to generate a next search inquiry from the list of search inquiries generated at sub-step 233 to the database; and obtain a number of other records corresponding to the next search inquiry therefrom, and store the obtained records are stored. It is clear that in one particular case, in response to the next search inquiry, a number of records that is greater than one may be obtained, in another case, one record may be obtained, in yet another case, no records may be obtained. In any case, upon the completion of sub-step 234, at sub-step 23, the processor 501 can be configured to check whether the end of the list of search inquiries has been reached, and if not, the method returns to the start of sub-step 234.

If it is determined at sub-step 235 that the end of the list of search inquiries has been reached, then the execution of the step 230 proceeds to sub-step 236, where the processor 501 can be configured to obtain a plurality of records obtained in response to submitting the list of search inquiries; and store the plurality of records.

If this number of records in the plurality of records is less than the predetermined parameter Fa, that is, the predetermined number of records were not obtained during the search, then the method proceeds to sub-step 238, where the processor 501 can be configured to decrease the value of the parameter Km. Km is decreased, for example, by one, and the method returns to the sub-step 233 of generating the list of search inquiries.

If the number of records obtained is greater than or equal to the predetermined parameter Fa, that is, a sufficient number of records has been obtained, the method proceeds to sub-step 237. In alternative non-limiting embodiments of the present technology, as described in detail below, the processor 501 may not be configured to execute sub-step 237, upon receiving a sufficient number of records, proceeds to execute to step 240 of the method 200 as described above with reference to FIG. 2.

At sub-step 237, the processor 501 can be configured to combine all obtained records of the plurality of records matching, with the predetermined level of accuracy, the attack roadmap. For example, referring to FIG. 4B, when searching for database records that match, with the predetermined level of accuracy, vertices of the first graph 400, as a result of performing sub-steps 233-236, the processor 501 can be configured to locate a second graph 460 and a third graph 470. As best seen in FIG. 4B, the second graph 460 and the third graph 470 also describe types of a complex attack that begin with the execution of an exploit exploiting the CVE-201711882 vulnerability. It can also be seen that, although they belong to the same family, both an exploit 462 and an exploit 472 are different from the exploit 410 of the first graph 400.

It can also be seen that after the execution the exploit 462, three steps of the attack described in the second graph 460 develop differently than the attack described by the first graph 400: the malware carriers 464, 465, and 466 belonging to different malware families that were not used in the original attack are launched sequentially. And only at the penultimate step of the attack associated with the second graph 460, just as in the original attack of the first graph 400, the crypter 468 of the HabibCrypter family (albeit different from the representative of the same family 440 used in the original attack) is launched, which decrypts and launches the main malware module 469, which, just as in the original attack, is a data stealer of the Pony family (although, again, not exactly the same as the data stealer 450 used in the original attack).

At the same time, the complex attack represented by the third graph 470, after executing the exploit 472, develops similarly to the original attack over the course of two steps. A crypter 473, belonging to the AtilaCrypter family just like the crypter 420, then a downloader 474, belonging to the Nemucod family just like the downloader 430, are executed sequentially. However, the sequence of the attack according to the third graph 470 then changes, malware carriers 475, 477 downloaded and executed by the downloader 474 and the main malware module 479 belong to different families than the malware used in the original complex attack according to the first graph 400.

Thus, by combining the vertices of the second graph 460 and the third graph 470 generated based on the plurality of records located in the database of roadmap attacks, the processor 501 can be configured to generate a combined graph 490 representative of a combined attack roadmap of the complex attack. Thus, the processor 501 can further be configured to use the combined attack road map for organizing protection of the network infrastructure from the complex malware attack.

As it can be appreciated from the combined graph 490, some steps of the combined attack roadmap, such as those associated with vertices 494 or 499, may be ambiguous, since these steps, in the second graph 460 and the third graph 470, correspond to representatives of different malware families. As applied to the representation of the attack roadmap in the form of a graph, several values are stored for the graph vertices corresponding to such ambiguous steps, where each value corresponds to one malware family.

The execution of the step 230 thus terminates, and the processor 501 can be configured to proceed with the execution of step 240 described above with reference to FIG. 2, where the processor 501 can be configured to retrieve the stored list of indicators of compromise corresponding to the combined attack roadmap represented by the combined graph 490 from the database of attack roadmaps.

In some non-limiting embodiments of the present technology, the processor 501 may be configured to skip sub-step 237. In these embodiments, after the completion of sub-step 236, when a sufficient (exceeding the value of Fa) number of records is found, the processor 501 proceeds with executing step 240 of the method 200, where it may be configured to generate the stored list of indicators of compromise corresponding to malware carriers of malware families found in the plurality of records retrieved from the database of attack roadmaps.

Computing Environment

Figure 5:
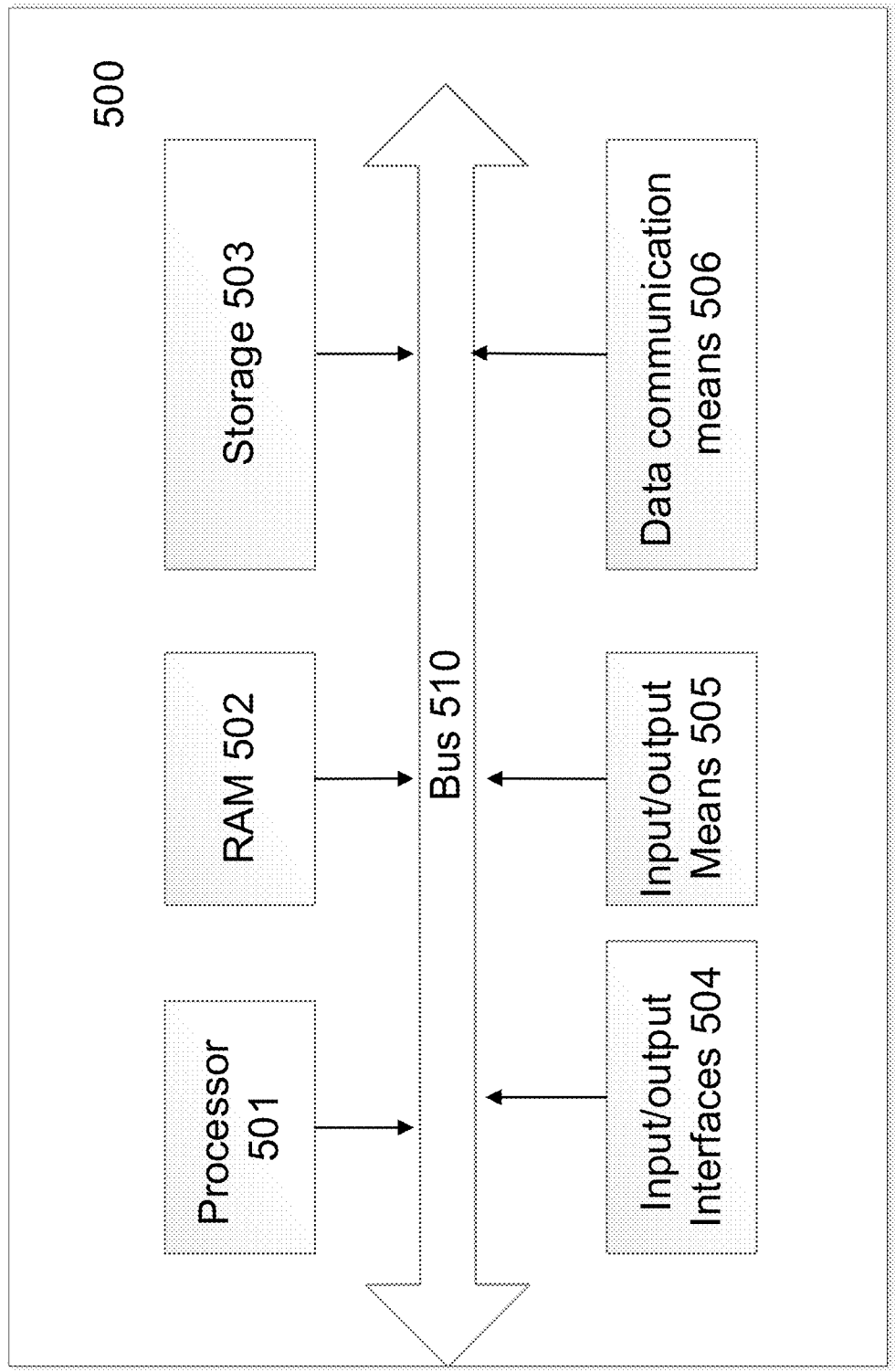
FIG. 5 depicts a schematic diagram of an example computing environment configurable for execution the methods of FIG. 2 and FIG. 3, in accordance with certain non-limiting embodiments of the present technology.

With reference to FIG. 5, there is depicted an example functional diagram of the computing environment 500 configurable to implement certain non-limiting embodiments of the present technology including the method 200 described above.

In some non-limiting embodiments of the present technology, the computing environment 500 may include: the processor 501 comprising one or more central processing units (CPUs), at least one non-transitory computer-readable memory 502 (RAM), a storage 403, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the method 100.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 203 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of the network, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 504 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for identifying indicators of compromise of complex attacks in a network infrastructure, the network infrastructure comprising a plurality of network elements, the method comprising:

obtaining a given malware carrier configured for execution of at least one main malware module by implementing a given complex attack, the given malware carrier being configured to be executed by a respective network element of the plurality of network elements of the network infrastructure; and the given complex attack being implemented by the given malware carrier triggering the execution of the at least one main malware module via at least one additional malware carrier;

generating an attack roadmap representative of the given complex attack by:

detecting, based on the given malware carrier, the at least one additional malware carrier, thereby forming a plurality of malware carriers associated with the attack roadmap, the at least one additional malware carrier being configured to be executed by a respective other network element of the plurality of network elements of the network infrastructure, the respective other network element being of a different type from that of the respective network element; and the plurality of malware carriers including the given malware carrier, the at least one additional malware carrier, and the at least one main malware module; and determining a sequence of execution of each one of the plurality of malware carriers defining the given complex attack;

determining a respective malware class of each one of the plurality of malware carriers of the attack roadmap;

generating a current list of indicators of compromise, each one of which is indicative of executing, by the respective network element, a respective one of the plurality of malware carriers defining the given complex attack, the current list of indicators of compromise including indicators of compromise of malware of different malware families;

searching a database to locate at least one stored attack roadmap including a plurality of stored malware carriers implementing a similar complex attack to the given complex attack, the similar attack being configured to trigger the execution of the at least one main malware module, the at least one stored attack roadmap being characterized by:

at least some of the plurality of stored malware carriers of the at least one stored attack roadmap being of same respective malware classes as the plurality of malware carriers of the attack roadmap;

the at least some of the plurality of stored malware carriers being configured to be executed by different network elements of the network infrastructure; and a sequence of execution of the at least some of the plurality of stored malware carriers defining the similar complex attack matching, within a predetermined match threshold, the sequence of execution of the plurality of malware carriers defining the given complex attack;

retrieving from the database a stored list of indicators of compromise, each one of which is indicative of executing, by the respective network element, a respective one of the at least some of the plurality of stored malware carriers defining the similar complex attack, the stored list of indicators of compromise including indicators of compromise of the malware of different malware families;

generating an amalgamated list of indicators of compromise based on the current list of indicators of compromise and the stored digital list of indicators of compromise;

storing, in the database, the amalgamated list of indicators of compromise for further identifying complex attacks configured to trigger the execution of the at least one main malware module.

2. The method of claim 1, wherein the obtaining the given malware carrier comprises obtaining from an external computer security system.

3. The method of claim 1, wherein the execution of the at least one main malware module is triggered by execution of the at least one additional malware carrier, which is triggered by execution the given malware carrier.

4. The method of claim 1, wherein the detecting the at least one additional malware carrier of the plurality of malware carriers associated with the attack roadmap comprises:

determining, for the given malware carrier, a respective malware carrier execution platform;

executing the given malware carrier in an isolated environment corresponding to the respective malware carrier execution platform; and registering state changes of the isolated environment in response to the executing the given malware carrier therein.

5. The method of claim 4, wherein the attack roadmap is generated in a form of a graph, vertices of which are representative of the plurality of malware carriers, and edges of which are representative of the sequence of execution of the plurality of malware carriers.

6. The method of claim 1, wherein the determining the respective malware class of each one of the plurality of malware carriers comprises applying at least one pre-trained classifier.

7. The method of claim 1, wherein the generating the current list of indicators of compromise comprises executing each one of the plurality of malware carriers in a respective isolated environment configured for extracting associated indicators of compromise from a respective source code, and storing the associated indicators of compromise in a form of a list.

8. The method of claim 1, wherein the generating the current list of indicators of compromise comprises executing each one of the plurality of malware carriers in a respective isolated environment configured for registering state changes thereof in response to executing therein a respective one of the plurality of malware carriers; and storing data indicative of the state changes in a form of a list.

9. The method of claim 8, wherein the respective isolated environment is further configured for extracting, from a respective internal structure of the respective one of the plurality of malware carriers executed therein, associated indicators of compromise; and wherein the generating the current the list of indicators of compromise further comprises adding the associated indicators of compromise to data indicative of the state changes of the respective isolated environment.

10. The method of claim 1, wherein the retrieving from the database the stored list of indicators of compromise comprises applying at least one database fuzzy search algorithm.

11. The method of claim 1, further comprising generating, a combined attack roadmap including the attack road map and the stored road map.

12. The method of claim 1, wherein, to remove duplicates in the amalgamated list of indicators of compromise, the method further comprises applying one or more regular expressions.

13. The method of claim 1, further comprising transmitting the current list of indicators of compromise to an external computer security system.

14. A system for identifying indicators of compromise of complex attacks in a network infrastructure, the system comprising:
at least one processor;
at least one non-transitory computer-readable memory storing instructions, which, when executed by the at least one processor, cause the system to:
obtain a given malware carrier configured for execution at least one main malware module by implementing a given complex attack,
the given malware carrier being configured to be executed by a respective network element of the plurality of network elements of the network infrastructure; and
the given complex attack being implemented by the given malware carrier triggering the execution of the at least one main malware module via at least one additional malware carrier;
generate an attack roadmap by:
detecting, based on the given malware carrier, the at least one additional malware carrier, thereby forming a plurality of malware carriers associated with the attack roadmap,
the at least one additional malware carrier being configured to be executed by a respective other network element of the plurality of network elements of the network infrastructure,
the respective other network element being of a different type from that of the respective network element; and
the plurality of malware carriers including the given malware carrier, the at least one additional malware carrier, and the at least one main malware module; and
determining a sequence of execution of each one of the plurality of malware carriers based on a respective execution algorithm associated therewith defining the given complex attack;
determine a respective malware class of each one of the plurality of malware carriers of the attack roadmap;
generate a current list of indicators of compromise, each one of which is indicative of executing, by the respective network element, a respective one of the plurality of malware carriers defining the given complex attack,
the current list of indicators of compromise including indicators of compromise of malware of different malware families;
search a database to locate at least one stored attack roadmap including a plurality of stored malware carriers implementing a similar complex attack to the given complex attack, the similar attack being configured to trigger the execution of the at least one main malware module, the at least one stored attack roadmap being characterized by:
at least some of the plurality of stored malware carriers of the at least one stored attack roadmap being of same respective malware classes as the plurality of malware carriers of the attack roadmap;
the at least some of the plurality of stored malware carriers being configured to be executed by different network elements of the network infrastructure; and
a sequence of execution of the at least some of the plurality of stored malware carriers defining the similar complex attack matching, within a predetermined match threshold, the sequence of execution of the plurality of malware carriers defining the given complex attack;
retrieve from the database a stored list of indicators of compromise, each one of which is indicative of executing, by the respective network element, a respective one of the at least some of the plurality of stored malware carriers defining the similar complex attack,
the stored list of indicators of compromise including indicators of compromise of the malware of different malware families;
generate an amalgamated list of indicators of compromise based on the current list of indicators of compromise and the stored digital list of indicators of compromise;
store, in the database, the amalgamated list of indicators of compromise for further identifying complex attacks configured to trigger the execution of the at least one main malware module.

15. The system of claim 14, wherein the processor is configured to obtain the given malware carrier from an external computer security system.

16. The system of claim 14, wherein the execution of the at least one main malware module is triggered by execution of the at least one additional malware carrier, which is triggered by execution the given malware carrier.

17. The system of claim 14, wherein to detect the at least one additional malware carrier of the plurality of malware carriers associated with the attack roadmap, the processor is configured to:
determine, for the given malware carrier, a respective malware carrier execution platform;
execute the given malware carrier in an isolated environment corresponding to the respective malware carrier execution platform; and
register state changes of the isolated environment in response to the executing the given malware carrier therein.

18. The system of claim 17, wherein the processor is configured to generate the attack roadmap in a form of a graph, vertices of which are representative of the plurality of malware carriers, and edges of which are representative of the sequence of execution of the plurality of malware carriers.

19. The system of claim 14, wherein to determine the respective malware class of each one of the plurality of malware carriers, the processor is configured to apply at least one pre-trained classifier.

20. The system of claim 14, wherein to generate the current list of indicators of compromise, the processor is configured to execute each one of the plurality of malware carriers in a respective isolated environment configured for extracting associated indicators of compromise from a respective internal structure, and storing the associated indicators of compromise in a form of a list.

* * * * *

UNITED STATES PATENT AND TRADEMARK OFFICE
CERTIFICATE OF CORRECTION

PATENT NO. : 11,847,223 B2  
APPLICATION NO. : 17/178320  
DATED : December 19, 2023  
INVENTOR(S) : Ilia Sergeevich Pomerantsev Page 1 of 1

It is certified that error appears in the above-identified patent and that said Letters Patent is hereby corrected as shown below:

In the Claims

Column 25, Claim 14, Lines 43-45 should read --the plurality of malware carriers defining the given complex attack;--

Signed and Sealed this  
Thirteenth Day of February, 2024

Katherine Kelly Vidal  
*Director of the United States Patent and Trademark Office*